(No Model.)

H. P. KENT.
TOE WEIGHT.

No. 320,365. Patented June 16, 1885.

WITNESSES
F. L. Durand
E. W. Johnson

INVENTOR
Hugh P. Kent
Attorney

UNITED STATES PATENT OFFICE.

HUXHUM P. KENT, OF PROVIDENCE, RHODE ISLAND.

TOE-WEIGHT.

SPECIFICATION forming part of Letters Patent No. 320,365, dated June 16, 1885.

Application filed September 18, 1884. (No model.)

*To all whom it may concern:*

Be it known that I, HUXHUM P. KENT, a citizen of the United States of America, residing at Providence, in the county of Providence and State of Rhode Island, have invented certain new and useful Improvements in Toe-Weights for Horses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to toe-weights for horseshoes; and it consists in the improvements hereinafter set forth and claimed.

Figure 1:
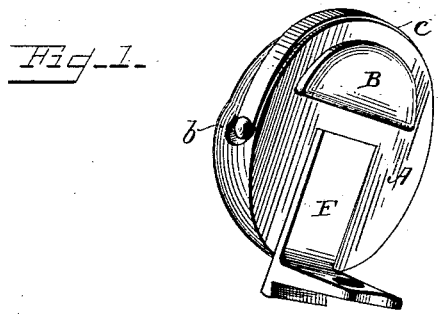
Figure 2:
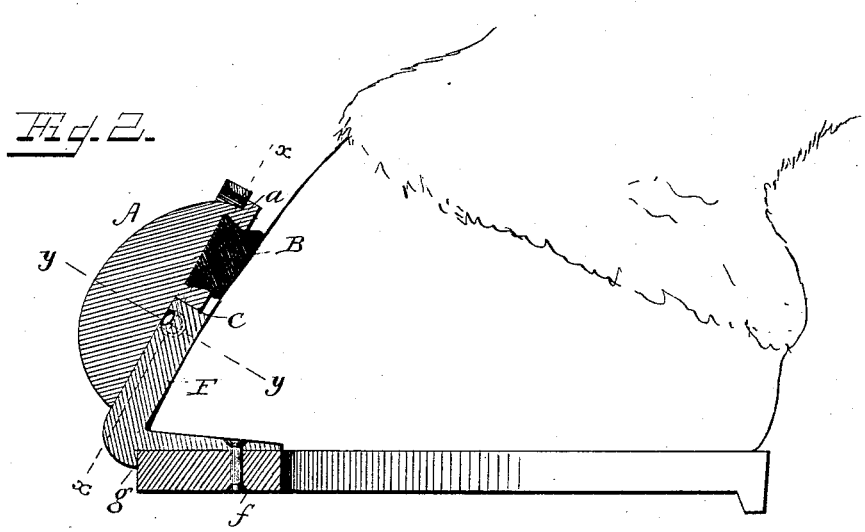
Figure 3:
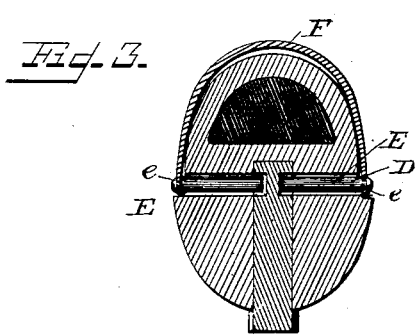
Figure 4:
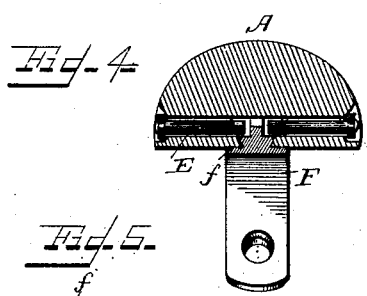
Figure 5:
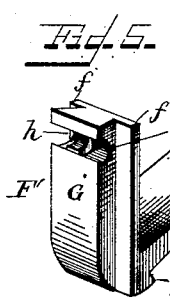

In the accompanying drawings, which illustrate my invention, Figure 1 is a perspective view. Fig. 2 is a sectional view; Fig. 3, a sectional view taken through the line $x\ x$ of Fig. 2. Fig. 4 is also a sectional view taken through the line $y\ y$ of Fig. 2. Fig. 5 is a detail perspective view.

A represents a toe-weight, the upper portion of which is provided with a countersunk recess, $a$, which retains a rubber pad or block, B. Centrally the lower portion of the weight is provided with a longitudinal dovetailed recess, C, which is intersected by a transverse perforation, D. This transverse perforation is for the reception of bolts E E, which are provided with recessed heads $e$, which retain thereon a U-shaped sprung, F, the ends of which exert a pressure, so as to throw the bolts inwardly. At a point opposite the heads of the bolts E the weight is bulged outwardly, said bulge tapering upwardly. This bulge is indicated by the letter $b$. A projecting flange is formed around the upper half of the toe-weight, against which flange $c$ the spring will bear when in the position shown in the accompanying drawings. The ends of the springs, which are slightly rounded on their sides, cause the same to exert a pressure upon the flange when the bolts are in the position shown in Figs. 3 and 4. When the spring is turned downward, the ends contacting with the bulge or inclined portion $b$ will force the ends apart, which ends carry with them the bolts E, so as to permit of the removal of the weight from the portion attached to the shoe. The angle-bar is attached to the front portion of the horseshoe, preferably by a rivet, $f$, and is provided near its front end, at the point where the upward turn commences, with a stop, $g$. The upper portion, F', is provided with side flanges, $f\ f$, from which projects a dovetailed portion, G, the upper end of which is provided with semicircular perforations $h\ h$, for the reception of the ends of the bolts E E.

To attach the weight to the portion F the spring is drawn outwardly so as to be at substantially right angles therewith. This movement effects the withdrawal of the bolts E from the dovetailed recess. The toe-weight is then slipped over the shank F', and the spring F turned so as to assume the position shown in Fig. 1, which forces the bolts into the recesses $h\ h$, and firmly connects the parts to each other.

It will be readily seen that the toe-weight will be held firmly upon the shank, and any jar or movement will be taken up by the rubber block B, which bears upon the upper portion of the hoof.

Having thus described my invention, what I claim as new, and desire to secure by Letters Patent, is—

1. The combination, in a toe-weight for horseshoes, of a U-shaped spring provided at its ends with bolts, said spring contacting with the sides of the weight, and adapted when turned to draw the bolts outwardly, so as to disengage them from a bar attached to the shoe, substantially as described.

2. In a toe-weight for horseshoes, a semispherical or oval block, A, having a dovetailed recess, transverse perforations, and projecting portions $b$, adjacent to said perforation, and a U-shaped spring having bolts attached at its ends, in combination with an angle-bar having a longitudinal dovetailed projection and recesses $h\ h$, substantially as and for the purpose set forth.

3. The combination, in a toe weight, of an angle-piece, F, consisting of the vertical dovetail G and a horizontal portion, the latter being perforated for attachment of the shoe, a block, A, provided at its rear with a vertical dovetail cavity for the reception of said vertical dovetail portion G, recesses $h\ h$, formed in the upper portion of said angle piece, the flange $c$, located on the upper side of said block A, a ∪-shaped spring embracing said blocks and carrying at its ends bolts which horizontally extend into said blocks, as specified, to engage the recesses $h\ h$ when said spring is moved to a horizontal position, substantially as set forth.

In testimony whereof I affix my signature in presence of two witnesses.

HUXHUM P. KENT.

Witnesses:
  ISAAC H. SOUTHWICK, Jr.,
  JOSEPH E. SPINK.